United States Patent Office 3,329,698
Patented July 4, 1967

3,329,698
HEAT-STABLE SILICON COMPOUNDS
Charlotte Popoff, Ambler, Pa., assignor to E. F. Houghton & Co., Philadelphia, Pa., a corporation of Pennsylvania
No Drawing. Filed Dec. 19, 1962, Ser. No. 245,664
11 Claims. (Cl. 260—448.8)

This invention relates to fluorine-containing silicon compounds. More particularly, it provides novel fluorine-containing silicon compounds which are particularly adapted for use as fire-resistant, high-temperature lubricants or as fire-resistant, high-temperature hydraulic fluids; novel methods of producing such compounds; novel methods of using such compounds, and novel compositions containing such compounds.

A hydraulic fluid is used to transfer power in applications utilizing fundamental hydraulic principles to give mechanical advantages. Fluid properties are a major consideration in hydraulic system design and establish the limits of the environment in which the hydraulic system will operate. There are few types of fluids which meet the requirements of practical hydraulic applications.

Viscosity-temperature characteristics directly affect the ability of a fluid to flow in a hydraulic system. A hydraulic fluid used over a wide temperature range must show a small change in the rate of flow with change of temperature, to reduce power loss due to fluid friction at low temperature and still retain proper sealing at elevated temperatures. A minimum viscosity of 2.5 centistokes at maximum use temperature is considered desirable to minimize seal leakage.

Additionally, hydraulic fluids should possess sufficient oxidation resistance to permit their use for a reasonable use period. They must not corrode or attack the metals of construction of the hydraulic system, or decompose even at the maximum use temperature. Absence of toxicity is required to the extent that direct contact, inhalation of vapor or effects of decomposition should not be injurious to personnel. Possession of a high bulk modulus is considered a desirable attribute. Numerous other properties are also considered in evaluating hydraulic fluids.

Aircraft use hydraulics extensively, in utility systems operating wheel brakes, landing gears, wing flaps, dive brakes, and numerous other devices. In recent years hydraulic systems have also been used in flight control boost systems and in full power flight control applications.

Petroleum products are now used in aircraft as hydraulic fluids. These fluids are, however, dangerously inflammable. Hydraulic fluid fires have occurred in airplanes with sufficient frequency to cause considerable attention to be given to the problem of finding fire-resistant hydraulic fluids. Factors in present day aircraft indicate trends towards increasing the hydraulic fluid fire hazard. For example, in the landing wheel area the fire hazard is increased by higher landing speeds; less space for brakes with consequent decrease of heat dissipation; and engine idle characteristics requiring constant braking during taxi. Moreover, aircraft ambient temperatures are already high and are expected to increase still further. Some electronic components and heated air ducts reach temperatures above the spontaneous ignition temperature of the petroleum base hydraulic fluids, which is 436° F. minimum at sea level.

An extensive program of fluid investigation has been conducted under the auspices of the U.S. Navy and Air Force since World War II, in the attempt to provide wide range hydraulic fluids with reduced flammability characteristics, without significant success.

The problem of supplying lubricants suitable for extreme temperature ranges has become equally as complex as that relating to hydraulic fluids. While many high performance power plants such as rocket engines, ram-jets, and other engines currently under development do not require direct lubrication, high temperatures are generated in auxiliary power systems necessary for the proper functioning of the vehicle. Under such conditions, currently known lubricants cannot function properly. Present military fluid lubricants have a maximum operating temperature of 400° F. as exemplified by proprietary products satisfying the requirements of Specification MIL–L9236B. Above 400° F., these materials present problems of extremely high volatility as well as poor lubricity and flammability hazards.

Moreover, the use of high specific energy systems, such as those involving liquid oxygen, fuming red nitric acid or other powerful oxidizers, present additional operating and handling hazards. These hazards are of such magnitude that even ground or platform handling equipment which does not come in direct contact with the fuel supply systems must utilize fire-resistant fluids for the safety and efficient handling of missiles before firing. Lubricants currently in use in such craft cannot cope with the extremes of conditions necessary for the proper operation of the craft.

The problems imposed in systems such as those discussed above are not limited to fluid lubricants. Semisolid lubricants or greases are required for the proper functioning of valves, control mechanisms, exposed gear systems, antifriction bearings, screw actuators and spherical bearings. Progress in the development of such greases for operations at temperatures greater than 500° F. has been retarded primarily by the lack of suitable fluids. Gelling or thickening agents capable of operation at high temperatures have been successfully developed. Completely satisfactory greases have not been available up to the present.

A particular object of this invention is to provide novel compounds particularly useful as hydraulic fluids which are fire-resistant, operable over a wide temperature range, at least as low as −25° F. and extending to well above 400° F., and which have unusually good heat stability, minimal oxidation corrosion, and good hydrolytic stability.

Another object is to provide a method of making the novel compounds of the stated characteristics.

A further object is to provide novel fluid compounds having properties adapting them for use as functional fluids in applications requiring high thermal stability and fluidity over a wide temperature range.

A still further object is to provide novel fluid compounds adapted for use as wide temperature range lubricating base fluids.

Another object is to provide novel lubricating compositions wherein the lubricant base fluid is a novel fluid compound as provided by this invention.

Still another object is to provide a novel method of transmitting hydraulic pressure.

Another object is to provide a novel method of lubricating.

These and other objects will become evident from the following specification and claims.

According to this invention there are provided as new compositions of matter, compounds having the formula:

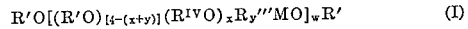

$$R'O[(R'O)_{[4-(x+y)]}(R^{IV}O)_xR_y'''MO]_wR' \qquad (I)$$

where R′ is a fluorine-substituted saturated aliphatic hydrocarbon radical of the formula:

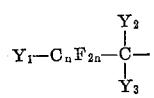

$$Y_1-C_nF_{2n}-\underset{Y_3}{\overset{Y_2}{\underset{|}{\overset{|}{C}}}}-$$

where $n$ is an integer of from 2 to 12 and $Y_1$, $Y_2$ and $Y_3$ are each selected separately from the group consisting of H and F, M is $$-\underset{|}{\overset{|}{Si}}-R''_z-\underset{|}{\overset{|}{Si}}-$$

where R″ is selected from the group consisting of phenylene and CA₂, where A is selected from the group consisting of H and lower alkyl, z is 1 when R″ is phenylene and an integer of from 1 to 8 when R″ is CA₂, R‴ and R^IV are alkyl radicals comprising a saturated aliphatic hydrocarbon chain substituted only by substituents selected from the group consisting of H and F, and containing up to 18 carbon atoms, x and y are each an integer of from 0 to 4 and x+y is an integer of from 0 to 4, and w is an integer of from 1 to 3.

Preferred compounds of this invention are those of Formula I comprising perfluoroalkoxydisilyl alkanes.

The compounds of Formula I fall into two broad classes namely, disilyl compounds and siloxanes.

The disilyl compounds have the general formula:

$$(R'O)_{[6-(x+y)]} \left[ -\underset{|}{\overset{|}{Si}}-R''_z-\underset{|}{\overset{|}{Si}}- \right] -R'''_y \quad (II)$$
$$(R^{IV}O)_x$$

where R′, R″, R‴, R^IV, x, y and z are as designated above in connection with Formula I. From Formula II it can be seen that the disilyl compounds of this invention always contain at least two perfluoroalkoxy groups. These may be on the same or different silicon atoms.

The disilyl compounds of Formula II fall into the following general classes, depending upon the groups attached to the silicon atoms:

(1) Perfluoroalkoxydisilyl compounds.
(2) Alkoxy perfluoroalkoxydisilyl compounds.
(3) Alkyl perfluoroalkoxydisilyl compounds.
(4) Alkyl alkoxy perfluoroalkoxydisilyl compounds.

The siloxane compounds of this invention are those compounds of Formula I where w is 2 or 3. These compounds are composed of two or three disilyl groups as specified in Formula I, each connected to the next through an oxygen atom. The groups on the silicon atoms are those set forth above, namely perfluoroalkoxy, alkoxy and alkyl groups. As is the case with the disilyl compounds, the siloxanes will comprise at least two perfluoroalkoxy groups.

The compounds of this invention may be prepared by reacting a hydrolyzable silicon compound containing a disilyl group of the formula:

$$-\underset{|}{\overset{|}{Si}}-R''_z-\underset{|}{\overset{|}{Si}}-$$

where R″ and z are as stated above in connection with Formula I, with a fluorinated alcohol of the formula:

$$Y_1-C_nF_{2n}-\underset{\underset{Y_3}{|}}{\overset{\overset{Y_2}{|}}{C}}-OH$$

where n is an integer of from 2 to 12 and Y₁, Y₂ and Y₃ are each selected separately from the group consisting of H and F. In the formation of perfluoroalkoxydisilyl and alkoxy perfluoroalkoxydisilyl compounds, the reaction of the method may be either transesterification or hydrolysis. In the formation of alkyl substituted disilyl compounds the reaction comprise Grignard synthesis followed by alcoholysis or transesterification.

In forming siloxanes of this invention, the above method is carried out in the presence of water so that there is simultaneous hydrolysis and alcoholysis. These reactions may follow Grignard synthesis where it is desired to have one or more alkyl groups present.

Although an object of this invention is to provide individual compounds which are heat-stable fluids, as well as methods for preparing such compounds, it will be appreciated by those skilled in the art that certain chemical reactions involved in preparing certain of the compounds may produce more than a single compound within Formula I. Such mixtures of compounds can be used as hydraulic fluids or as lubricants without separating the mixtures into individual compounds.

The present novel compounds of Formula I above are fire-resistant, heat-stable functional fluids particularly adapted for use as wide temperature range hydraulic fluids and lubricating base fluids.

The hydraulic fluid compositions provided by this invention comprise one or more of the Fomula I compounds as a base fluid. Additives which improve oxidation stability, hydrolytic stability, antiwear properties, viscosity-temperature characteristics or the like may be present in such compositions.

The said novel compounds, singly or mixtures thereof, form the lubricating base of lubricating compositions as provided by this invention. Such lubricating compositions may additionally comprise additives as conventional in the lubricating art.

The method of hydraulic transmission of power provided by this invention consists in operating a hydraulic pumping power system wherein hydraulic pressure is transmitted by a hydraulic fluid comprising one or more novel compounds of this invention.

The method of lubricating provided in this invention consists in interposing a lubricating composition comprising one or more of the said novel compounds as a lubricating base fluid between surfaces in frictional contact.

Particular advantages of the novel method of the present invention are that it produces the presently provided novel compounds directly and simply, while having a high degree of flexibility.

The novel fluid compounds of the present invention are particularly valuable because they possess an unusual combination of properties especially adapting them for use as a functional fluid, particularly as a hydraulic fluid. Thus, such compounds remain fluid, do not volatilize, and do not change excessively in viscosity over a very wide temperature range, etxending from −65° F. to 600° F. or above, frequently to 650° F.; have exceptional thermal stability; they are generally non-corrosive; they are unusually good lubricants; they have the high bulk modulus which is desirable for a hydraulic fluid; and most importantly, because the present compounds are also fire-resistant.

The provision of a fluid having the stated properties and thus adapted for use as a hydraulic fluid in aircraft hydraulic systems while at the same time being fire-resistant is a particularly important development in view of the very intensive efforts made over an extended period of time to develop a fluid meeting these specifications. The fact that such an intensive effort had been made is evidence of the need and demand for such novel products and also of the difficulty in attaining a product which would meet the specifications.

The novelty of the unusual combination of properties possessed by the presently provided compounds will be particularly evident when these fluids are compared to various other fluids which have been proposed or used in the prior art as hydraulic fluids. Thus, the fluids proposed for use as fire-resistant hydraulic fluids have included, on the one hand, fluorinated polymers. However, the fluorinated polymeric fluids of this type which have a viscosity at 100° F. comparable to that of the presently provided novel compounds at the same temperature have an undesirably high pour point. This excludes these fluorinated polymers from any uses where a relatively low pour point is required. The pour point of certain of the presently provided compounds may be as low as −70° F. On the other hand, certain siliceous materials have been proposed for use as hydraulic fluids. Of these, the thermally stable alkyl aryl silicone polymers also have a pour point substantially higher than that of the presently provided fluid compounds. Thus, like the above mentioned fluorinated polymers, they are not capable of meeting many of the low temperature operability specifications which are met by the compounds of this invention. Moreover, such silicone polymers also have poor lubricity, and their lubricating properties are very much inferior to those of the presently provided compounds. The alkyl and substituted alkyl silicates proposed for use as hydraulic fluids heretofore even less well adapted to replace petroleum-base hydraulic fluids. Not only are they poor lubricants, but they are flammable.

It will accordingly be evident that the presently provided novel compounds are outstandingly and unexpectedly adapted for use, as wide temperature range, fire-resistant hydraulic fluids.

Additionally, the unusually high load-carrying properties of the compounds of this invention makes them valuable for use as a lubricating base fluids for extreme pressure lubricants, particularly in high temperature environments.

As will be appreciated, the temperature properties of the present compounds also adapt them for use as a heat transfer agents—for example, as coolants in computing machines. Moreover, these compounds have a high density, fitting them for use as flotation media in high temperature gyro compasses and the like.

Compositions embodying these novel compounds obviously share the stated advantages; and the procedures provided by this invention for transmitting hydraulic pressure and for lubricating are advantageous in that the wide temperature range of operability of the presently provided novel compounds gives them substantially greater scope and applicability than has been possible heretofore.

Referring now to the method of the present invention, this employs as one reactant a fluorinated alcohol of the formula:

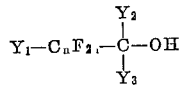

where $n$ is an integer of from 1 to 12 and $Y_1$, $Y_2$ and $Y_3$ are each selected separately from the group consisting of H and F. Either individual alcohols or mixtures of alcohols of the stated formula may be used in conducting the present method. The stated fluorinated alcohols include perfluoroalkanols such as perfluoroethyl alcohol, perfluoropropyl alcohol, perfluoroisopropyl alcohol, perfluorobutyl alcohol, perfluorohexyl alcohol, perfluorooctyl alcohol, perfluorodecyl alcohol, perfluorododecyl alcohol and perfluorotridecyl alcohol. The stated fluorinated alcohols also include hydroperfluoroalkanols. One such group of hydroperfluoroalkanols comprises 1,1-dihydroperfluoronalkanols. These can be prepared, for example, by hydrogenation of a perfluoroalkanoic acid. Exemplary thereof are 1,1-dihydroperfluoropropyl alcohol, 1,1-dihydroperfluorobutyl alcohol, 1,1-dihydroperfluoroisoamyl alcohol, 1,1-dihydroperfluoro-2-ethylhexyl alcohol, 1,1-dihydroperfluorodecyl alcohol, and so forth. Another such group of hydroperfluoroalkanols comprises 1,1-omegatrihydroperfluoroalkanols. These may be prepared, for example, by telomerizing a perfluorinated olefin with methyl alcohol. The major products (approx. 85–90%) of telomerization are primary alcohols, the remainder being secondary alcohols. These secondary alcohols may react with the hydrolyzable silicon compounds without significantly affecting the physical properties of the resulting compounds. Such fluorinated primary alcohols form the presently preferred type of fluorinated alcohol for use in the method of this invention. Illustrative thereof are, for example, 1,1,3-trihydroperfluoropropyl alcohol, 1,1,5-trihydroperfluoroamyl alcohol, 1,1,7-trihydroperfluoroheptyl alcohol, 1,1,9-trihydroperfluorononyl alcohol, 1,1,11-trihydroperfluoroundecyl alcohol, and 1,1,13-trihydroperfluorotridecyl alcohol.

Hydrolyzable silicon compounds employed in preparing the compounds of this invention contain a disilyl group of the formula:

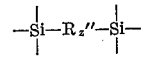

where $R''$ is selected from the group consisting of phenylene and $CA_2$, where A is selected from the group consisting of hydrogen and lower alkyl, and $z$ is 1 when $R''$ is phenylene and an integer of from 1 to 8 when $R''$ is $CA_2$. These hydrolyzable silicon compounds are disilyl compounds capable of reacting with the above-described fluorinated alcohols. Not all of the valences of the silicon atoms of the hydrolyzable silicon compound need be hydrolyzable groups. However, at least two of these groups should be hydrolyzable for reaction as by transesterification or hydrolysis with a fluorinated alcohol. The remaining valencies may be satisfied by alkyl and/or alkoxy groups as hereinafter more fully described.

Certain preferred hydrolyzable silicon compounds for use in forming the novel compounds of this invention by transesterification are alkoxy disilyl compounds of the formula:

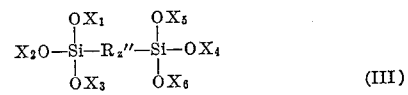

(III)

where $R''$ and $z$ are as designated hereinabove, and each of $X_1$, $X_2$, $X_3$, $X_4$, $X_5$ and $X_6$ is an alkyl radical comprising a saturated aliphatic carbon chain substituted only by substituents selected from the group consisting of H and F, and containing up to 18 carbon atoms.

In the transesterification reaction, alkoxy groups of the disilyl reactant (III) are exchanged for those of a perfluoro alcohol having a higher boiling point than the alcohol formed in the reaction. This is a catalytic reaction, heat being the simplest catalyst. The lower boiling alcohol which is formed in the reaction is continuously removed to drive the reaction to completion. The ease with which the transesterification reaction takes place to a large measure depends upon the difference in boiling point between the perfluoro alcohol reactant and the alcohol reaction product. If there is a substantial difference in boiling points, all or at least a major portion of the alkoxy groups of the disilyl reactant (III) may be replaced with perfluoroalkoxy groups. However, where this boiling point difference is relatively narrow, it may be possible to replace only a part of the alkoxy groups.

Where it is desired to replace all of the alkoxy groups of the disilyl compound (III), preferred compounds are those in which each of $X_1$, $X_2$, $X_3$, $X_4$, $X_5$ and $X_6$ is a lower alkyl radical containing from 1 to 4 carbon atoms. Ethyl radicals are particularly preferred. Typical disilyl reactants of this type are bis(trimethoxysilyl)ethane, bis(triethoxysilyl)ethane, bis(triethoxysilyl)benzene, bis(triethoxysilyl)heptane, bis(tripropoxysilyl)butane, and the like.

In the disilyl compounds of Formula III not all of the alkoxy groups need be the same. This may be desirable where only certain alkoxy groups are to be replaced by perfluoroalkoxy groups by transesterification. Thus, for example in the disilyl reactants one or more of the X's may be a relatively long chain alkyl radical comprising a saturated aliphatic carbon chain substituted only by hydrogen or fluorine atoms. Exemplary of such alkyl radicals are dodecyl, tridecyl, hexadecyl, octadecyl radicals and similar radicals where certain of the hydrogen atoms have been replaced by fluorine atoms. The remaining X's may be short chain alkyl radicals, such as ethyl, which can be readily replaced by perfluoroalkyl radicals by transesterification. According to this invention, the disilyl reactant should have at least two positions on the silicon atoms which can be substituted by a perfluoroalkoxy group. Both of these positions may be on one silicon atom or each silicon atom may have at least one substitutable position.

The hydrolyzable disilyl reactant, rather than having six alkoxy groups as described above, may have one or more of such groups replaced by an alkyl group comprising a saturated aliphatic carbon chain substituted only by hydrogen and/or fluorine atoms and containing up to 18 carbon atoms. Typical of such alkyl radicals are n-nonyl, isotridecyl and octadecyl radicals and similar radicals where certain of the hydrogen atoms have been replaced by fluorine atoms. These alkyl groups are uneffected by transesterification and are present in the compounds produced.

Ordinarily, a hydrolyzable disilyl compound having one or more, but not more than four, alkyl groups, where each alkyl group is attached directly to a silicon atom, will be prepared from a halogenated disilyl compound by Grignard synthesis. This reaction is discussed in greater detail hereinafter. After the alkyl groups have been introduced, the remaining halogen atoms may be replaced by alkoxy groups by alcoholysis, and subsequently, two or more of these alkoxy groups may be replaced by perfluoroalkoxy groups by transesterification. However, since halogenated disilyl compounds are readily converted directly to the disilyl compounds of this invention by alcoholysis and to the siloxane compounds by concurrent alcoholysis and hydrolysis, the above procedure where there is formed an intermediate alkyl alkoxy disilyl compound after Grignard synthesis is not as preferred a procedure as that involving direct substitution of perfluoroalkoxy groups for halogen atoms as described hereinafter.

In the transesterification reaction, the proportions of reactants will depend upon the number of perfluoroalkoxy groups which are to be introduced to the disilyl group, and the number of reactive positions on the alkoxy disilyl reactant. Where it is desired to produce a hexaperfluoroalkoxy disilyl compound, there should be six reactive positions on the two silicon atoms, and about six moles of perfluorinated alcohol should be used with each mole of disilyl reactant. A slight excess of perfluoro alcohol is preferably used, e.g., a 10% excess. The perfluoro alcohol, of course, should have a substantially higher boiling point than the alcohol corresponding to the alkoxy group of the disilyl reactant. However, if not all of the alkoxy groups of the disilyl reactant are to be replaced by perfluoroalkoxy groups, a smaller number of moles of perfluoro alcohol are used. There should be sufficient perfluoro alcohol and at least two reactive positions in the alkoxy disilyl reactant so as to provide compounds with at least two perfluoroalkoxy groups.

In forming the compounds of this invention, if may also be desirable to introduce to the disilyl group new alkoxy groups as well as perfluoroalkoxy groups by transesterification. This may be accomplished by means of an alkyl carbinol, the alkyl radical of which is a saturated aliphatic carbon chain substituted only by substituents selected from the group consisting of H and F, and containing up to 10 carbon atoms. The alkyl carbinol should, of course, have a boiling point higher than that of the alcohol corresponding to at least some of the alkoxy groups of the alkoxy disilyl reactant. Exemplary of such alkyl carbinols are 2-trifluoromethyl-n-propyl alcohol, tert-butyl alcohol, 3-methyl-3-(trifluoromethyl) butyl alcohol, 2,4-bis(trifluoromethyl)amyl alcohol, 2-ethyl-hexyl alcohol, n-nonyl alcohol, isotridecyl alcohol, sec-tetradecyl alcohol, perfluoroethyl hexyl carbinol, octadecyl alcohol, and so forth.

The number of moles of alkyl carbinol per mole of disilyl reactant will depend upon the degree of substitution desired. In any event, however, the resulting compound should not be substituted with more than four of such alkoxy groups, and should contain two or more perfluoro alkoxy groups.

It is readily apparent to those skilled in the art that in any instance where there is less than complete transesterification at all reactive positions of the disilyl reactant with perfluoroalkoxy groups of the same kind, where a mixture of different perfluorinated alcohols is used, or where substitution of the disilyl reactant with alkyl or alkoxy groups as well as with perfluoroalkoxy groups is desired, more than a single compound may be formed. For example, if the hydrolyzable silicon compound comprises bis(triethoxysilyl)ethane, and transesterification involves the use of two moles of 2-ethyl hexyl alcohol and four moles of 1,1-trihydroperfluoro heptyl alcohol, the following compounds are formed in substantial amounts:

$$\{(CHF_2(CF_2)_5CH_2O)_2(CH_3(CH_2)_3CH(C_2H_5)CH_2O)SiCH_2\}_2$$

and $$(CHF_2(CF_2)_5CH_2O)(CH_3(CH_2)_3CH(C_2H_5)CH_2O)_2SiCH_2$$
$$(CHF_2(CF_2)_5CH_2O)_3SiCH_2$$

In addition, the reaction product may contain other compounds within Formula I.

According to this invention, where mixtures of compounds are produced they may be used as such, or may be separated into individual components.

The reaction mixture comprising the fluorinated alcohol and the hydrolyzable disilyl reactant may, and preferably will, also contain a base as a catalyst of the reaction therebetween. Any of a wide variety of bases may be used as a catalyst in this connection, including inorganic bases such as sodium hydroxide, lead hydroxide, or the like, and bases containing an organic radical such as the alkoxides of alkali metals, aluminum, magnesium, antimony, titanium and so forth. Alkali metal alkoxides are preferred. Illustrative of such catalysts are sodium methoxide, potassium ethoxide, titanium (isopropoxide) and so forth.

If desired, the reaction mixture including the fluorinated alcohol and silyl reactant may also comprise an inert solvent or diluent such as carbon tetrachloride, chloroform, ethylene dichloride or like halogen compounds; acetonitrile, dimethylformamide or like nitrogen compounds; ethyl ether, isopropyl ether, dioxane or like oxygen compounds; and toluene, hexane or like hydrocarbons.

The temperature at which the reaction is conducted may be any temperature between room temperature and the decomposition temperature of the reaction mixture components. Preferably it is at least about 100° C. Conveniently the reaction may be carried out at the reflux temperature of the mixture. In the reaction, alcohols will be formed by displacement of the alkoxy radicals present on the alkyl silicate. Where the said alcohols are low boiling, it will generally be convenient to conduct the reaction at a temperature at which they are boiled off from the reaction mixture.

The fluorinated alcohol will be reacted with the hydrolyzable silicon compound in accordance with the present method to form a reaction product comprising a disilyl compound of Formula I. Preferably, the reactants will be maintained in contact under conditions conducive to transesterfication as stated above, heated in the presence of a base as catalyst, until the resulting reaction product contains a substantial proportion, at least about 10%, and preferably above about 2% by weight, of compound desired. In a preferred embodiment of this invention, the hydrolyzable silicon compound and fluorinated alcohol are heated in the presence of a base until a reaction is substantially complete, after which the heating is discontinued.

While the foregoing description sets forth a preferred method of producing the compounds of this invention, this invention is not limited thereto.

In a particularly preferred embodiment of this invention, the novel compounds are produced by reacting a fluorinated alcohol as defined above with a hydrolyzable halogenated disilyl compound. The stated halogenated disilyl compound will be of the formula:

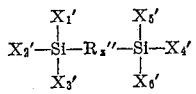

where R″ and z are as designated hereinabove, and each of $X_1'$, $X_2'$, $X_3'$, $X_4'$, $X_5'$ and $X_6'$ is a halogen atom having an atomic weight above 20. Chlorine is the preferred halogen; bromine and iodine are equivalents thereof but less convenient from a practical point of view. Exemplary of halogenated disilyl compounds for use in the present invention are bis(trichlorosilyl)ethane, bis-(trichlorosilyl)benzene, bis(tribromosilyl)butane, bis-(triiodosilyl)heptane and so forth. Particularly preferred halogenated disilyl compounds for use in this invention are bis(trichlorosilyl)ethane and bis(trichlorosilyl)benzene.

Where the method of this invention is conducted using a hydrolyzable silicon compound comprising such a halogenated disilyl compound, the halogenated disilyl compound may be reacted on the one hand with a fluorinated alcohol as defined hereinabove as the sole reactant; or alternatively, with a mixture of such fluorinated alcohol and another alcohol as herein described. Prior to reaction with either of these reactants, alkyl groups may be introduced by Grignard synthesis. In addition, by hydrolysis, which may be carried out concurrently with alcoholysis, siloxanes may be formed.

On reaction of a halogenated disilyl composed of the stated formula with an alcohol, the halogen substituents on the silicon atoms are displaced by radicals produced by removing H from the alcohol. In one embodiment, in conducting the present method using a halogenated disilyl compound, alcohol must be provided to displace all of the halogen atoms present in the disilyl compound and produce a disilyl compound in which each silicon atom is esterfied by ester radicals selected from the class consisting of saturated hydrocarbon radicals and fluorine-substituted saturated hydrocarbon radicals. If a number of moles of the fluorinated alcohol equal to the number of halogen atoms in the halogenated disilyl reactant is provided per mole of the disilyl reactant, the halogenated disilyl reactant may be reacted with only the fluorinated alcohol. If less than the stated proportion of fluorinated alcohol is used, provision must be made to displace the other halogen atoms of the disilyl reactant with radicals of another alcohol. Such alcohol will comprise an alkylcarbinol containing up to 18 carbon atoms as described above in connection with the alkylcarbinols which may be included in the reaction mixture comprising a fluorinated alcohol and an alkoxy disilyl reactant, to which reference is made for the definition and examples of said alcohols. Where alcohol comprising a mixture of fluorinated alcohol and another alcohol as herein defined is reacted with a halogenated disilyl compound, the fluorinated alcohol will, in any case, be present in the reaction mixture in a proportion to provide a reaction product comprising a disilyl compound containing at least two fluoroalkoxy groups as herein defined (see Formula I).

If desired, the halogenated disilyl reactant and alcohol may be contacted in an inert solvent or diluent. Exemplary of such diluents and solvents are, for example, carbon tetrachloride, chloroform, ethylene dichloride or like halogen compounds; acetonitrile, dimethylformamide or like nitrogen compounds; ethyl ether, isopropyl ether, dioxane or like oxygen compounds; and toluene, hexane or like hydrocarbons.

Catalysts are generally unnecessary. The halogenated disilyl compounds are highly reactive, and in general it is sufficient to mix the disilyl reactant with the selected reactant comprising a fluorinated alcohol or mixture of alcohols at room temperature to effect their reaction and produce a reaction product comprising a fluoroalkoxy or alkoxy fluoroalkoxy disilyl compound of this invention in accordance with the present method. If desired, the reaction mixture may be heated to a temperature of from room temperature up to the decomposition temperature of the reactants. The reaction will be allowed to proceed until the evolution of hydrogen halide from the reaction mixture has ceased.

Prior to effecting reaction between alcohol and halogenated disilyl compound, the latter may be alkylated by Grignard synthesis using an alkyl magnesium halide. The alkyl group of the Grignard reagent will comprise a saturated aliphatic carbon chain substituted only by the substituents H and F and containing up to 18 carbon atoms. Exemplary of such Grignard reagents are tert-butyl magnesium bromide, 3 methyl-3-(trifluoromethyl)butyl magnesium chloride, n-vinyl magnesium bromide, sec-tetrodecyl magnesium chloride, perfluoroethyl hexyl magnesium iodide, octodecyl magnesium chloride, and so forth. The proportion of Grignard reagent to halogenated disilyl reactant shall be such as not to replace more than four of the halogens of the disylil reactant with alkyl groups.

The Grignard synthesis may be permitted to proceed at room temperature, although somewhat elevated temperatures in the range of 40–70° C. may be used to speed up the rate of reaction. The reaction mixture ordinarily will contain a solvent suitable for Grignard synthesis, such as ether, toluene, etc. Grignard synthesis is a procedure well known to skilled chemists and therefore need not be discussed in greater detail.

Where the formation of siloxanes of this invention is desired, the reaction between alcohol and the halogenated disilyl compound may be carried out in the presence of water. In this case, concurrent alcoholysis and hydrolysis takes place. Where a disiloxane is desired, about one mole of water will be in the reaction mixture for every two moles of halogenated disilyl reactant. Where a trisiloxane is desired, about two moles of water will be used for every three moles of disilyl reactant. The halogen atoms on the disilyl reactant which are not replaced by oxygen atoms which link the disilyl groups together will be replaced by alkoxy and fluoroalkoxy groups as described above, there being, of course at least two fluoroalkoxy groups per molecule.

The reaction product resulting from the above-stated method, wherein a halogenated disilyl reactant is employed, or from the previously described method, wherein an alkoxy disilyl reactant is employed, may be of such a nature that it is useful without further treatment for the purposes of the present invention. Generally, however, it will be submitted to one or more further processing steps to provide a product or individual compounds adapted for uses contemplated by this invention.

A first optional processing step to be applied to the reaction product consists in treating it to remove impurities and like undesired contaminants therefrom. In particular, impurities of strongly acidic or strongly basic character are desirably removed. Such impurities may consist, for example, of a basic catalyst added to the initial reaction mixture, or of acidic hydrogen halide formed in the reaction mixture. Removal of such impurities can be effected by treating the reaction product with an absorbent. Any of a wide variety of absorbent materials may be used for this purpose. Thus for example, the absorbent may consist of silica gel, alumina, charcoal, an absorbent clay such as fuller's earth, or the like. Treatment therewith consists merely in bringing the product to be purified into intimate contact with the absorbent, in an amount sufficient to remove the quantity of impurities present in the product: for example, in amount sufficient to bring the reaction product to a substantially neutral pH. The stated step of treating the reaction product with an absorbent to purify it may be conducted at any point in the working up of the reaction product; conveniently it may follow immediately after the formation of the reaction product.

A second step involved in processing the reaction product of the presently provided novel method will consist in separating from the product any volatile products present. Generally, the simplest technique for effecting separation of the desired portion of the reaction product comprising the compounds of this invention, will consist of distilling off the undesired volatile product component of the reaction mixture, and recovering the residue as the desired product. If desired, alternative means known to those skilled in the art for removal of undesired reaction product components, such as solvent extraction, may be used.

A third processing step will sometimes advantageously be included in the processing of the presently provided products, consisting of separating the reaction mixture into individual compounds of this invention. This can be accomplished by distillation, solvent extraction, etc.

The compounds of this invention produced as above stated will be generally fluid, fire-resistant materials which as such are often adapted for use in various applications. Sometimes they will advantageously be mixed with other substances to form compositions more specifically adapted for the intended use. Thus various additives may sometimes be admixed with the stated compounds to improve their properties for use as hydraulic fluids or as lubricating fluids. Such additives may comprise, for example, oiliness agents such as soluble phosphate esters; viscosity index improvers; corrosion inhibitors such as organic amines; antioxidants; and the like, which are compatible with the compounds of this invention.

Thickeners will be added to the present compounds to improve lubricating compositions of the consistency of a grease. Useful thickeners which may be used to advantage when the present compounds are used for high temperature applications are, for example, graphite, silica gel, and so forth. Such compositions will comprise a lubricating base fluid consisting of a novel compound of this invention, and a thickener; additionally, they may include additives of the nature discussed in the previous paragraph, as property improvers.

According to this invention, there are provided the following types of compounds:

(I) Perfluoroalkoxy disilyl alkanes of the formula $$(R'O)_3Si(CA_2)_zSi(OR')_3$$

A typical compound of this type has the formula $$(CHF_2(CF_2)_5CH_2O)_3SiC_2H_4Si(OCH_2(CF_2)_5CHF_2)_3$$

(II) Perfluoroalkoxy disilyl benzenes of the formula

A typical compound of this type has the formula

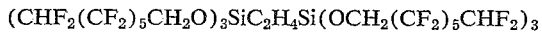

(III) Alkoxy fluoroalkoxy disilyl alkanes of the formula

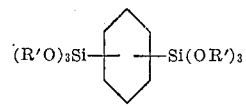

where x is 1 to 4. One compound of this type has the formula

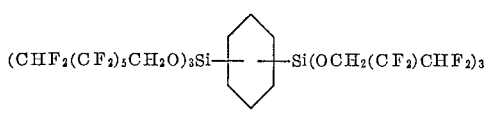

(IV) Alkoxy fluoroalkoxy disilyl benzenes. These compounds are similar to alkoxy fluoroalkoxy disilyl alkanes except that the silicon atoms are joined by a phenylene radical rather than an aliphatic hydrocarbon chain. Ordinarily the silicon atoms will be in the para position on the benzene ring, but they may take other positions. An example of a compound of this type is one having the formula:

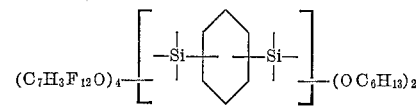

(V) Alkyl fluoroalkoxy disilyl alkanes and benzenes. These are similar to compounds of types III and IV except that the compounds contain alkyl groups as defined herein in place of alkoxy groups. Exemplary of this type of compound is one having the formula $$[(CHF_2(CF_2)_5CH_2O)_2CH_3SiCH_2]_2$$

(VI) Alkyl alkoxy fluoroalkoxy disilyl alkanes and benzenes. These compounds are similar to those of types III, IV and V, except that they contain both alkyl and alkoxy groups in addition to fluoroalkoxy groups.

(VII) Siloxanes. These compounds will contain one or two oxygen atoms between disilyl groups and the silicon atoms of the disilyl groups will comprise an aliphatic hydrocarbon chain or a phenylene group. The remaining positions on the silicon atoms may comprise perfluoroalkoxy groups as defined above. Some of these positions may also be satisfied with alkoxy or alkyl groups as defined above. A typical compound has the formula

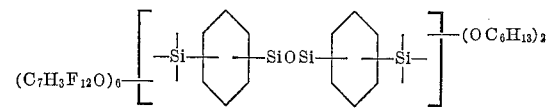

The invention is illustrated but not limited by the following examples.

EXAMPLE I

This example illustrates preparation of a fluoroalkoxy disilyl compound by alcoholysis.

A mixture of 219 g. (0.66 mole) of 1,1,7-trihydroperfluoroheptyl alcohol, 100 ml. of benzene and 30 ml. of toluene was charged into a flask fitted with a dropping funnel, reflux condenser, stirrer and thermometer, care being taken to exclude moist air. A solution of 30 g. (0.1 mole) of bis(trichlorosilyl) ethane in 50 ml. of benzene and 30 ml. of toluene was added dropwise to the mixture in the flask within a 10 minute period while the temperature of the mixture in the flask was allowed to warm up to room temperature and then was gradually heated to 80° C. After a quantitative evolution of hydrogen chloride, removal thereof from the flask being accomplished by purging with a dry, inert gas, the solvent (benzene, toluene) and excess of the fluorinated alcohol was stripped under a pressure of 0.2 mm. Hg. A yield of 78% of a fluid product was obtained.

The fluid product produced as stated above has the following properties:

Chemical formula:

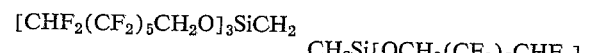

Appearance: light amber color
Pour point: Below —30° F. (ASTM Standard Method of Test for cloud and pour points: D–97)
Viscosity:
  At 100° F., 71.22 cs.
  At 210° F., 8.95 cs.
  (ASTM Tentative Method of Test for kinematic viscosity: D–445)
Viscosity change:
  At 100° F., —15.2%
  At 210° F., —17.0%

Evaporation rate: 6½ hours at 400° F.—weight loss 17%
Thermal stability (6 hours under nitrogen): Loss due to decomposition at 690° F.—0.47%
Hydrolytic stability (MIL–H–19457) 16 hours at 50° C.: 25–30% breakdown
Auto-ignition temperature: below 900° F. (ASTM D–286–30)

EXAMPLE II

This example illustrates the preparation of an alkoxy fluoroalkoxy disilyl compound by alcoholysis.

34.0 g. (0.33 mole) of 2-ethyl butanol was added dropwise over a period of 30 minutes to 49.6 g. (0.165 mole) of bis-(trichlorosilyl)ethane in a 500 ml. flask equipped with a stirrer, thermometer, reflux condenser and drying tube. During addition of the 2-ethyl butanol the temperature of the reaction mixture in the flask dropped to 15° C. After all of the 2-ethyl butanol had been added, the mixture was heated at about 90° C. for a period of 8 hours until there was no further measurable amount of hydrogen chloride evolved. The hydrogen chloride was removed as formed by means of a stream of nitrogen. Subsequently 243.2 g. (0.66 mole+10% excess) of 1,1,7-trihydroperfluoroheptyl alcohol was added to the flask and the mixture was heated for about 15 hours at a temperature of 84°–127° C. Further hydrogen chloride was evolved, the hydrogen chloride being removed by purging with nitrogen.

Unreacted perfluoro alcohol reactant was removed by distillation at 0.4 mm. of Hg.

The fluid residue produced as stated above has the following properties:

Chemical formula:
$[(CHF_2(CF_2)_5CH_2O)_2(CH_3CH_2(C_2H_5)CH_2O)SiCH_2]_2$ (predominantly)
Pour point: below −55° F. (ASTM Standard Method of Test for cloud and pour points, D–97)
Flash point: above 340° F. (ASTM Standard Method of Test for flash point by means of Cleveland Open Cup: D–92)
Fire point: above 465° F. (ASTM Standard Method of Test for fire point by means of Cleveland Open Cup: D–92)
Viscosity:
    At 100° F., 36.40 cs.
    At 210° F., 5.55 cs.
    Viscosity Index, 97.3 (ASTM Tentative Method of Test for kinematic viscosity, D–445)
Viscosity temperature coefficient: 0.847
Appearance: greenish brown color
Vapor phase chromatogram: major peak (MP), 250° C.
Auto-ignition Temperature: below 700° F. (ASTM Standard Test Method, D–286–30)

EXAMPLE III

This example illustrates the preparation of an alkoxy fluoroalkoxy disilyl compound by alcoholysis.

49.5 g. (0.165 mole) of bis-(trichlorosilyl)ethane was charged to a 500 ml. flask equipped with a stirrer, thermometer, reflux condenser and drying tube. 43.4 g. (0.33 mole) of 2-ethyl hexanol was added dropwise to the flask over a period of 15 minutes during which time the temperature dropped from room temperature to 15° C. The mixture in the flask was then heated to 150° C. and kept at this temperature for 2 hours. Subsequently the mixture was reheated at 100–120° C. for 4 hours, purging of hydrogen chloride being effected by means of a stream of nitrogen. At the end of this 4 hour period only a trace of hydrogen chloride was being evolved.

The mixture was cooled to 45° C. and 243.2 g. (0.66 mole+10% excess) of 1,1,7-trihydroperfluoroheptyl alcohol was added to the contents of the flask over a period of 45 minutes. During addition of the fluoro alcohol the mixture was slowly heated so that the temperature at completion of addition of the fluoro alcohol was 75° C. The mixture was heated to 150° C. over a period of 1½ hours and subsequently heated for 2 hours at this temperature. Thereafter, the mixture was heated at 100° C. for 7½ hours while hydrogen chloride was purged by means of a stream of nitrogen. At the end of this period a determination for chlorine proved negative.

The mixture in the flask was stripped of unreacted perfluoro alcohol at a pot temperature of 150° C. and a pressure of 1.0 mm. Hg., and 240 g. of a pale amber colored liquid was recovered representing a yield of 87.3%.

The fluid residue produced as stated above has the following properties:

Chemical Formula:
$[(CHF_2(CF_2)_5CH_2O)_2(CH_3(CH_2)_3CH(C_2H_5)CH_2O)SiCH_2]_2$ (predominantly)
Pour point: below −70° F. (ASTM Standard Method of Test for cloud and pour points, D–97)
Viscosity:
    At 100° F., 32.18 cs.
    At 210° F., 5.15 cs.
    Viscosity index 96.4
Viscosity-Temperature Coefficient: 0.845
Termal Stability: 690° F. (6.5 hours under Nitrogen)
Loss due to decomposition and evaporation: 2.03%
Final viscosity at 100° F.: 35.5 cs.
Change in viscosity: +10.2%
Final Neutralization Number: 0.28
Change in Neutralization Number: +0.15
Auto-ignition temperature: 720° F., 9 drops (ASTM Standard Test Method D–286–30)
Vapor Phase Chromatogram:
    Major peak (MP)—285° C.
    Minor peak (mp)—290°, 310° C.

EXAMPLE IV

This example illustrates the preparation of an alkyl fluoroalkoxy disilyl compound by Grignard synthesis and alcoholysis.

A 500 ml. flask equipped with a thermometer, stirrer, and reflux condenser was charged with 49.5 g. (0.165 mole) of bis-(trichlorosilyl)ethane and 50 ml. of toluene. 53.7 g. (0.33 mole) of n-butyl magnesium bromide (Grignard reagent) was added to the flask over a period of 37 minutes while the temperature of the flask was maintained at 25°–30°C. The resulting mixture was heated for 1½ hours at 40° C. and then filtered through a sepatory funnel. The solid material on the filter was rinsed with toluene and dried in an oven. The filtrate was collected.

243.3 g. (0.66 mole+10% excess) of 1,1,7-trihydroperfluoroheptanol was added to the filtrate described above and the mixture was heated at 65° C. for about 7 hours, hydrogen chloride being purged from the flask by means of a stream of nitrogen.

The mixture was subsequently reheated for 7 hours at 113° C., hydrogen chloride being purged by means of a nitrogen stream.

Toluene was stripped from the reaction product by heating under a pressure of 1 mm. of Hg. The contents of the flask was then filtered through a Buchner funnel, using No. 2 paper and a pale yellow, slightly turbid liquid product was obtained.

The fluid product produced as stated has the following properties:

Chemical Formula: Predominantly a mixture of compounds having the respective formulas:

$[(CHF_2(CF_2)_5CH_2O)_2(CH_3(CH_2)_3)SiCH_2]_2$
$(CHF_2(CF_2)_5CH_2O)_3SiCH_2CH_2Si(OCH_2(CF_2)_5CHF_2)((CH_2)_3CH_3)_2$

Pour point: Below −55° F. (ASTM Standard Method of Test for cloud and pour point: D–97)
Flash point: Above 350° F. (ASTM Standard Method of Test for flash point by means of Cleveland Open Cup: D–97)
Fire point: Above 425° F. (ASTM Standard Method of Test for fire point by means of Cleveland Open Cup: D–97)
Viscosity:
    At 100° F., 27.57 cs.
    At 210° F., 4.39 cs.
    Viscosity index 56
Viscosity-temperature coefficient: 0.849
Vapor phase chromatogram:
    Major peak—235°, 240° C.
    Minor peak—225°, 175° C.
Auto-ignition temperature: Below 700° F. (ASTM Standard Method of Test: D–286–30)

EXAMPLE V

This example illustrates the preparation of an alkoxy fluoroalkoxydisilyl compound by transesterification.

332.1 g. (1 mole) of 1,1,7-tetrahydroperfluoroheptyl alcohol and 115.0 g. (0.165 mole) of hexa-2-ethylbutoxydisilyl ethane was placed in a flask equipped with a stirrer, thermometer, Vigreux column, overhead thermometer, condenser and receiving flask. The mixture was heated at approximately 170° C. for 6 hours. Thereafter unreacted fluoro alcohol was separated by distillation.

The fluid residue produced as stated above has the following properties.
Chemical formula:

$(CHF_2(CF_2)_5CH_2O)_2(CH_3(CH_2)_3CH(C_2H_5)CH_2O)$
    $SiC_2H_4Si(OCH_2(CF_2)_5CHF_2)_3$ (predominantly)

Pour point: below −65° F. (ASTM Standard Method of Test for cloud and pour point: D–97)
Viscosity:
    At 100° F., 22.56 cs.
    At 210° F., 4.37 cs.
    Viscosity Index, 116
Viscosity temperature coefficient: 0.906
Flash point: above 340° F. (ASTM Standard Method of Test for flash point by means of Cleveland Open Cup D–97)
Fire point: above 435° F. (ASTM Standard Method of Test for fire point by means of Cleveland Open Cup: D–97)
Auto-ignition temperature: below 700° F. (ASTM Standard Method of Test: D–286–30)
Vapor phase chromatogram:
    Major peak—275° C.
    Minor peak—265°, 295° C.

EXAMPLE VI

This example illustrates the preparation of a fluoroalkoxy polysiloxane by simultaneous alcoholysis and hydrolysis.

A liter flask was charged with 59.4 g. (.2 mole) of bis-(trichlorosilyl) ethane and heated to 70° C. Over a period of 50 minutes 365 g. (1.1 mole) of 1,1,7-trihydroperfluoroheptyl alcohol and 1.8 g. (0.1 mole) of water were introduced simultaneously to the flask at a ratio of 11–12 cc. of the fluoro alcohol to 0.1 cc. of water. During this period the temperature of the mixture in the flask decreased to about 49° C. Hydrogen chloride formed was vented from the flask after the first and tenth minute of addition of water and fluoro alcohol. Thereafter the mixture in the flask was heated to a temperature of 141° C. over a period of 2½ hours.

The following day the mixture was heated to a temperature of about 140° C. for a period of 4 hours and purging of hydrogen chloride was effected by means of a stream of nitrogen. The contents of the flask was filtered into a second flask and unreacted fluoro alcohol was thereafter removed from the filtrate under a vacuum of 1 mm. of Hg. 298.8 g. of amber colored fluid was obtained.

The fluid product produced as stated has the following properties.
Chemical formula:

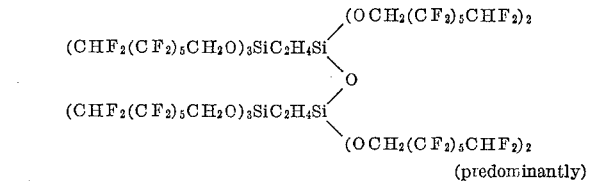

(predominantly)

Pour point: below −35° F. (ASTM Standard Method of Test for cloud and pour point: D–97)
Flash point: above 475° F. (ASTM Standard Method of Test for flash point by means of Cleveland Open Cup: D–97)
Fire point: above 700° F. (ASTM Standard Method of Test for fire point by means of Cleveland Open Cup: D–97)
Viscosity:
    At 100° F., 128 cs.
    At 200° F., 1197 cs.
    Viscosity index, 95
Viscosity temperature coefficient: 0.901
Auto-ignition temperature: 885° F., 8 drops. (ASTM Standard Method of Test: D–286–30)
Vapor phase chromatogram: Major peak, 235° C.

EXAMPLE VII

This example illustrates the preparation of an alkoxy fluoroalkoxy polysiloxane by simultaneous alcoholysis and hydrolysis.

A one liter flask was charged with 86.0 g. (0.25 mole) of bis-(trichlorosilyl)benzene and then 25.6 g. (0.25 mole) of 2-ethyl butanol was introduced to the flask over a 30 minute period. The mixture in the flask was permitted to react until evolution of hydrogen chloride ceased (about 6 hours).

332 g. (0.625 mole) of 1,1,7-trihydroperfluoroheptanol was introduced to the flask dropwise over a period of 1½ hours. 2.2 g. (0.125 mole) of water was introduced dropwise to the flask over the same period of time. The resulting mixture was heated at 110° C. for 6 hours and thereafter at 100° C. for 8 hours. Hydrogen chloride formed by the reaction was purged by means of a stream of nitrogen.

320 g. of 1,1,7-trihydroperfluoroheptanol was introduced to the flask and the mixture was further heated at 100° C. for 7 hours.

The fluoro alcohol was stripped from the liquid in the flask by vacuum distillation (0.5 mm. Hg.) at 150° C., and a yield of 310 g. of a liquid product was obtained after filtering through a Buchner funnel.

The fluid product produced as stated above has the following properties.

Chemical formula:

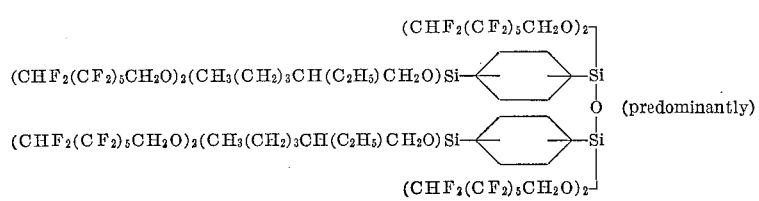

Pour point: below —25° C. (ASTM Standard Method of Test for cloud and pour point: D-97)

Viscosity:
  At 100° F., 159.2 cs.
  At 210° F., 15.7 cs.
  Viscosity index, 103

Viscosity-temperature coefficient: 0.905

Vapor phase chromatogram:
  Major Peak (MP)—270° C.
  Minor Peak (mp)—225° C.

EXAMPLE VIII

This example illustrates preparation of an alkoxy fluoroalkoxy disilyl compound by alcoholysis.

A liter flask equipped with a stirrer, thermometer, reflux condenser and drying tube was charged with 1 mole of bis(trichlorosilyl)ethane and 1 mole of 2-ethylhexanol was introduced to the flask over a period of 1½ hours. During addition of the 2-ethylhexanol the temperature of the reaction mixture in the flask decreased to 15° C. After all of the 2-ethylhexanol had been added, the mixture was heated at about 90° C. for a period of 8 hours until there was no further measurable amount of hydrogen chloride evolved, the hydrogen chloride being removed as formed by means of a stream of nitrogen.

Subsequently 5 moles of 1,1,7-trihydroperfluoroheptanol was added to the contents of the flask and the resulting mixture was heated from about 15 hours at a temperature of 84-127° C. Further hydrogen chloride was evolved and was purged from the flask by means of a stream of nitrogen. Unreacted perfluoroalcohol was thereafter stripped from the fluid in the flask by distillation under vacuum (0.4 mm. Hg).

The fluid residue produced as stated above has the following properties:

Chemical formula:

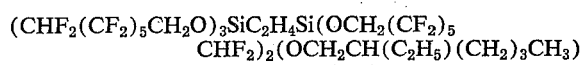

Pour point: below —50° F. (ASTM Standard Method of Test for cloud and pour points: D-97)

Viscosity:
  At 100° F., 47.4 cs.
  At 210° F., 6.56 cs.
  Viscosity Index, 60.7.

Viscosity-temperature coefficient: 0.861

Auto-ignition temperature: 725° F., 10 drops. (ASTM Standard Method of Test: D-286-30)

EXAMPLE IX

A 500 ml. flask was charged with 49.5 gms. bis(trichlorosilyl)ethane (1/6 M) and 50 cc. dry toluene. Then, 110 cc. of an approximately 3 M methyl magnesium bromide solution in ether were added with cooling. The temperature was kept below 30° C. during addition (approx. 30-45 min.). The mixture was heated at reflux (56° C.) for 7 hours. After this time, the initially greyish MgBrCl was white. The solids were filtered off under a $N_2$ stream to avoid hydrolysis. The filter cake was thoroughly washed and subsequently dried at 90° C. Recovered: 57 gms. MgBrCl (completely water soluble).

Added dropwise to the filtrate were 243.5 gms. 1,1,7-trihydroperfluoroheptanol (2/3 M and 10% excess). The mixture was then gradually taken up to reflux temperature (90° C.) and subsequently purged with dry nitrogen gas to ease the HCl evolution. During the latter part, the kettle temperature went up to 120-130° C. Total heating time amounted to 21 hours. The chlorine content was then 0.015%.

The residual solvent and excess of trihydroperfluoroheptanol were removed overhead under vacuum (17″ pressure, kettle temperature—147° C.).

The final stripping was achieved under 0.15 mm. vacuum (kettle temperature—155° C.). Distillate—27.0 gms.

The residual fluid was filtered over Cabosil and has the following physical characteristics. Yield—214 gms.

Chemical formula: Compounds having the respective formulas:

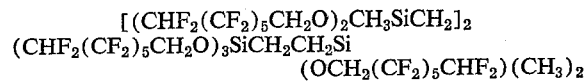

and their isomers

Pour point: Below —40° F. (ASTM Standard Method of Test for cloud and pour Points: D-97)

Viscosity:
  At 100° F., 40.7 cs.
  At 210° F., 5.45 cs.
  Viscosity Index, 65

Auto-ignition temperature: Below 800° F. (ASTM Standard Test Method D-286-30)

Vapor phase chromatogram:
  Major Peak (MP)—225, 260° C.
  Minor Peak (mp)—140, 160, 170, 200° C.

Hydrolytic stability: .43 wt. percent solids (M1L-H-19457)

EXAMPLE X

A 500 ml. flask was charged with 49.5 gms. bis(trichlorosilyl)ethane (1/6 M) and 50 cc. dry toluene. Then, 55.5 cc. of an approximately 3 M ethyl magnesium chloride solution in ether were added with cooling. During the addition (20-25 min.), the temperature did not exceed 30° C. Subsequently, the mixture was refluxed (55° C.) for 1¾ hours. The white solids were filtered off under a dry $N_2$ stream to avoid hydrolysis. The filter cake was washed with toluene and subsequently dried at 90° C. Recovered were 26.0 gms. MgCl$_2$ (theoretical 15.9 gms.) which contained 4.9 gms. water insoluble matter.

While the solution was gradually heated to reflux temperature (90° C.), 304.5 gms. 1,1,7-trihydroperfluoroheptanol (5/6 M and 10% excess) were added to the filtrate. After 5 hours of heating, the mixture was purged with dry nitrogen to complete the HCl evolution. After an additional 8 hours reaction time, the chlorine content amounted to 0.187 p/oo.

The solvent was removed overhead under vacuum (27″ pressure, kettle temperature 103° C.). The excess of trihydroperfluoroheptanol was stripped under 0.2 mm. vacuum (kettle temperature 150° C., maximum). Distillate: 80 gms.

The residual fluid was filtered over Cabosil and has the following physical characteristics. Yield: 226.3 gms.

Chemical formula:
  $(CHF_2(CF_2)_5CH_2O)_5Si_2(C_2H_4)(C_2H_5)$ and isomers

Pour point: below —50° F. (ASTM Standard Method of Test for cloud and pour points: D-97)

Viscosity:
  At 100° F., 44.96 cs.
  At 210° F., 5.84 cs.
  Viscosity index, 70.8

Auto-ignition temperature: below 800° F. (ASTM Standard Test Method D-286-30)

Vapor phase chromatogram:
  Major Peak (MP)—230, 240, 260° C.
  Minor Peak (mp)—175, 185° C.

Hydrolytic stability: 75 wt. percent solids (M1L-H-19457)

While the invention has been described with particular reference to specific individual embodiments thereof, it is to be appreciated that modifications and variations may be made within the scope of the invention and the appended claims.

What is claimed is:

1. As new compositions of matter, compounds having the formula:

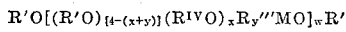

where R′ is a fluorine-substituted saturated aliphatic hydrocarbon radical of the formula:

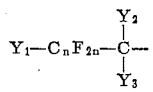

where $n$ is an integer of from 2 to 12 and $Y_1$, $Y_2$ and $Y_3$ are each selected separately from the group consisting of H and F, M is

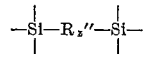

where R″ is selected from the group consisting of phenylene and $CA_2$, where A is selected from the group consisting of H and lower alkyl, $z$ is 1 when R″ is phenylene and an integer from of 1 to 8 when R″ is $CA_2$, R‴ and $R^{IV}$ are alkyl radicals comprising a saturated aliphatic carbon chain substituted only by substituents selected from the group consisting of H and F, and containing up to 18 carbon atoms, $x$ and $y$ are each an integer of from 0 to 4 and $x+y$ is an integer of from 0 to 4, and $w$ is an integer of from 1 to 3.

2. A heat-stable fluid comprising a fluoroalkoxy disilyl of the formula:

$$(C_7H_3F_{12}O)_3SiC_2H_4Si(OC_7H_3F_{12})_3$$

3. A heat-stable fluid comprising an alkoxy fluoroalkoxy disilyl of the formula:

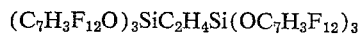

where R′ is a fluorine-substituted saturated aliphatic hydrocarbon radical of the formula:

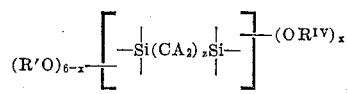

where $n$ is an integer of from 2 to 12 and $Y_1$, $Y_2$ and $Y_3$ are each selected separately from the group consisting of H and F, A is a lower alkyl and $z$ is an integer of from 1 to 8, $R^{IV}$ is an alkyl radical comprising a saturated aliphatic carbon chain substituted only by substituents selected from the group consisting of H and F and containing up to 18 carbon atoms, and $x$ is an integer of from 0 to 4.

4. A heat-stable fluid comprising an alkoxy fluoroalkoxy disilyl of the formula:

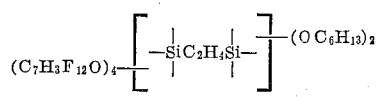

5. A heat-stable fluid comprising an alkoxy fluoroalkoxy disilyl of the formula:

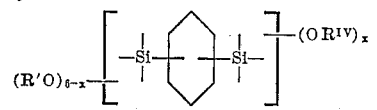

where R′ is a fluorine-substituted saturated aliphatic hydrocarbon radical of the formula:

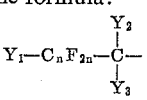

where $n$ is an integer of from 2 to 12 and $Y_1$, $Y_2$, and $Y_3$ are each selected separately from the group consisting of H and F, $R^{IV}$ is an alkyl radical comprising a saturated aliphatic carbon chain substituted only by substituents selected from the group consisting of H and F, and $x$ is an integer of from 0 to 4.

6. A heat-stable fluid comprising a fluoroalkoxy disilyl of the formula:

7. A heat-stable fluid comprising an alkoxy fluoroalkoxy disilyl of the formula:

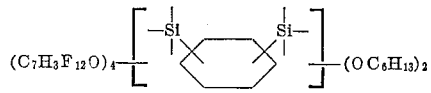

8. A heat-stable fluid comprising an alkyl fluoroalkyl disilyl compound of the formula:

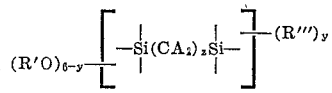

where R′ is a fluorine-substituted saturated aliphatic hydrocarbon radical of the formula:

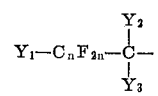

where $n$ is an integer of from 2 to 12 and $Y_1$, $Y_2$ and $Y_3$ are each selected separately from the group consisting of H and F, A is a lower alkyl radical and $z$ is an integer of from 1 to 8, R‴ is an alkyl radical comprising a saturated aliphatic carbon chain substituted only by substituents selected from the group consisting of H and F containing up to 18 carbon atoms, and $y$ is an integer of from 1 to 4.

9. A heat-stable fluid comprising an alkyl fluoroalkyl disilyl compound of the formula:

$$[(CHF_2(CF_2)_5CH_2O)_2CH_3SiCH_2]_2$$

10. A heat-stable fluid comprising an alkyl fluoroalkoxy disilyl compound of the formula:

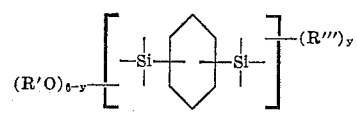

where R′ is a fluorine-substituted saturated aliphatic hydrocarbon radical of the formula:

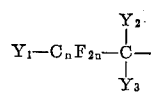

where $n$ is an integer of from 2 to 12 and $Y_1$, $Y_2$ and $Y_3$ are each selected from the group consisting of H and F. R‴ is an alkyl radical comprising a saturated aliphatic carbon chain substituted only by substituents selected from the group consisting of H and F and containing up to 18 carbon atoms, and $y$ is an integer of from 1 to 4.

11. A heat-stable fluid comprising an alkyl fluoroalkyl disilyl compound of the formula:

$$(CHF_2(CF_2)_5CH_2O)_5Si_2C_6H_4(C_2H_5)$$

References Cited

UNITED STATES PATENTS

| | | | |
|---|---|---|---|
| 2,544,079 | 3/1951 | Goodwin | 260—448.2 |
| 3,012,006 | 12/1961 | Holbrook et al. | 260—448.8 |
| 3,064,028 | 11/1962 | Jenkner | 260—448.2 |
| 3,065,177 | 11/1962 | Hotten | 252—49.6 |
| 3,065,251 | 11/1962 | Jones et al. | 260—448.2 |
| 3,066,100 | 11/1962 | Trautman | 252—49.6 |
| 3,133,111 | 5/1964 | Wheeler | 260—448.8 |
| 3,223,642 | 12/1965 | Smith et al. | 260—448.8 |

TOBIAS E. LEVOW, *Primary Examiner.*

DANIEL E. WYMAN, HELEN M. McCARTHY,
*Examiners.*

I. VAUGHN, P. F. SHAVER, *Assistant Examiners.*

UNITED STATES PATENT OFFICE
CERTIFICATE OF CORRECTION

Patent No. 3,329,698                                    July 4, 1967

Charlotte Popoff

It is hereby certified that error appears in the above numbered patent requiring correction and that the said Letters Patent should read as corrected below.

Column 3, line 65, for "reaction" read -- reactions --; column 4, line 26, for "in" read -- by --; column 5, lines 38 to 40, for that portion of the formula reading $$F_2 - \quad\quad \text{read} \quad\quad F_{2n} -$$

line 41, for "1" read -- 2 --; column 7, line 53, for "if" read -- it --; column 8, line 12, for "1,1-" read -- 1,1,7— --; column 8, line 64, for "2%" read -- 25% --; column 14, line 23, for "termal" read -- thermal --; column 18, line 42, for "(90° C.)" read -- (93° C.) --; line 68, for "75 wt." read -- .75 wt. --; column 20, line 31, for "F" read -- F and --.

Signed and sealed this 1st day of October 1968.

(SEAL)
Attest:

EDWARD M. FLETCHER, JR.                          EDWARD J. BRENNER
Attesting Officer                                      Commissioner of Patents